(12) United States Patent
Lundin et al.

(10) Patent No.: US 11,798,210 B2
(45) Date of Patent: Oct. 24, 2023

(54) NEURAL NETWORK BASED DETECTION OF IMAGE SPACE SUITABLE FOR OVERLAYING MEDIA CONTENT

(71) Applicant: salesforce.com, inc., San Francisco, CA (US)

(72) Inventors: Jessica Lundin, Seattle, WA (US); Michael Reynolds Sollami, Cambridge, MA (US); Alan Martin Ross, San Francisco, CA (US); Brian J. Lonsdorf, Belmont, CA (US); David James Woodward, Westfield, IN (US); Owen Winne Schoppe, Orinda, CA (US); Sönke Rohde, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/116,944

(22) Filed: Dec. 9, 2020

(65) Prior Publication Data

US 2022/0180581 A1 Jun. 9, 2022

(51) Int. Cl.
*G06T 11/60* (2006.01)
*G06T 7/70* (2017.01)
(Continued)

(52) U.S. Cl.
CPC ............ *G06T 11/60* (2013.01); *G06F 18/214* (2023.01); *G06N 3/08* (2013.01); *G06T 7/70* (2017.01); *G06T 2207/10016* (2013.01); *G06T 2207/20081* (2013.01); *G06T 2207/20084* (2013.01); *G06T 2210/12* (2013.01)

(58) Field of Classification Search
None
See application file for complete search history.

(56) References Cited

U.S. PATENT DOCUMENTS

2005/0013486 A1 1/2005 Wiedemann et al.
2006/0026628 A1 2/2006 Wan et al.
(Continued)

OTHER PUBLICATIONS

Alibaba Cloud, "Alibaba Luban: AI-based Graphic Design Tool," Dec. 19, 2018, seven pages, [Online] [Retrieved on Jan. 19, 2021] Retrieved from the Internet <URL: https://www.alibabacloud.com/blog/alibaba-luban-ai-based-graphic-design-tool_594294>.
(Continued)

*Primary Examiner* — Yanna Wu
(74) *Attorney, Agent, or Firm* — Fenwick & West LLP (57) ABSTRACT

Disclosed herein are system, method and computer readable storage medium for detecting space suitable for overlaying media content onto an image. The system receives a candidate image which may be an image or a video frame. The candidate image is then input into a neural network. The neural network may output coordinates and one or more dimensions representing one or more bounding boxes for inserting media content into the candidate image. The one or more bounding boxes may be transmitted with a request for a media content item to be displayed in a bounding box. In response to the request the media content item may be received, and the candidate image and the media content item overlaid on top of the candidate image within the bounding box may be displayed.

17 Claims, 6 Drawing Sheets

(51) Int. Cl.
*G06N 3/08* (2023.01)
*G06F 18/214* (2023.01)

(56) References Cited

U.S. PATENT DOCUMENTS

| | | |
|---|---|---|
| 2010/0174985 A1 | 7/2010 | Levy et al. |
| 2016/0063727 A1 | 3/2016 | Gao et al. |
| 2017/0039457 A1* | 2/2017 | Yu .................. G06V 30/194 |
| 2017/0154425 A1* | 6/2017 | Pierce .................. G06N 3/045 |
| 2017/0278289 A1* | 9/2017 | Marino .................. G06T 7/11 |
| 2018/0013977 A1 | 1/2018 | Martineau |
| 2018/0089505 A1 | 3/2018 | El-Khamy et al. |
| 2019/0222776 A1 | 7/2019 | Carter et al. |
| 2020/0005033 A1 | 1/2020 | Bellert |
| 2020/0327375 A1 | 10/2020 | Naveh et al. |
| 2021/0182628 A1 | 6/2021 | Regina et al. |
| 2021/0383106 A1 | 12/2021 | Maggio et al. |

OTHER PUBLICATIONS

Hua, X., "Challenges and Practices of Large Scale Visual Intelligence in the Real-World," MM '18: Proceedings of the 26th ACM international conference on Multimedia, Oct. 2018, pp. 364.

Lin, T. et al., "Microsoft COCO: Common Objects in Context," arXiv:1405.0312, Feb. 21, 2015, pp. 1-15.

Redmon, J. et al., "You Only Look Once: Unified, Real-Time Object Detection," arXiv:1506.02640, Nov. 12, 2015, pp. 1-10.

Ren, S. et al., "Faster R-CNN: Towards Real-Time Object Detection with Region Proposal Networks," IEEE Transactions on Pattern Analysis and Machine Intelligence, vol. 39, Iss. 6, Jun. 2017, pp. 1-9.

Rohde, S., "Einstein Designer—AI-Powered, Personalized Design at Scale," Jun. 23, 2020, 14 pages, [Online] [Retrieved on Jan. 19, 2021] Retrieved from the Internet <URL: https://medium.com/salesforce-ux/einstein-designer-ai-powered-personalized-design-at-scale-367d71b85a3d>.

Unsplash, "Unsplash: The internet's source of freely-usable images," Date Unknown, four pages, [Online] [Retrieved on Jan. 19, 2021] Retrieved from the Internet <URL: https://unsplash.com/>.

Vempati, S. et al., "Enabling Hyper-Personalisation: Automated Ad Creative Generation and Ranking for Fashion e-Commerce," arXiv:1908.10139, Aug. 27, 2019, pp. 1-10.

PCT International Search Report and Written Opinion, PCT Application No. PCT/US2021/015739, dated Jul. 15, 2021, 15 pages.

Breuel, T. M. "Two Geometric Algorithms for Layout Analysis" International Workshop on Document Analysis Systems, Lecture Notes in Computer Science, vol. 2423, Aug. 9, 2002, pp. 188-199.

Liu, W. et al. "SSD: Single Shot Multibox Detector," European Conference on Computer Vision, Lecture Notes in Computer Science, vol. 9905, Sep. 17, 2016, pp. 21-37.

United States Office Action, U.S. Appl. No. 17/162,245, dated Jun. 22, 2022, 23 pages.

United States Office Action, U.S. Appl. No. 17/162,245, dated Mar. 11, 2022, 22 pages.

Zhao, Y. et al. "Training Cascade Compact CNN with Region-IoU for Accurate Pedestrian Detection," IEEE Transactions on Intelligent Transportation Systems, vol. 21, No. 9, Aug. 13, 2019, pp. 3777-3787.

* cited by examiner

NEURAL NETWORK BASED DETECTION OF IMAGE SPACE SUITABLE FOR OVERLAYING MEDIA CONTENT

TECHNICAL FIELD

The disclosure generally relates to the field of detecting space within an image or a video frame where content can be inserted and more specifically to neural network-based detection of space suitable for overlaying media content.

BACKGROUND

Many images and video frames include areas where text and other content may be inserted without obscuring important part or parts of the image or the video frame. Those areas are sometimes referred to as copy space. For example, an image or a video frame may focus on a ship and the people on that ship. However, that image or video frame may include areas where all is shown is a sky and/or ocean. Those areas may be used for displaying text or other media content (e.g., images). In one example, those areas may be used to display additional content items to a viewer. In another example, copy space may be used to insert links and other information into an image or a video frame.

Various systems are available today that enable a curator to mark copy space on an image. That process is usually time consuming and inefficient when hundreds of thousands of images of video frames must be marked. Therefore, it is desirable to automatically and accurately identify copy space on images and video frames.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed herein are system, method and computer readable storage medium for detecting space suitable for overlaying media content onto an image (copy space). The system receives a candidate image which may be an image or a video frame. Generally, an image or a video frame may have some space for inserting media content without covering vital portions of the image. The candidate image is then input into a neural network that has been trained with training data including a multitude of images and, for each image of the plurality of images, one or more corresponding bounding boxes. The neural network may output coordinates and one or more dimensions representing one or more bounding boxes for inserting media content into the candidate image. The one or more bounding boxes may be transmitted with a request for a media content item to be displayed in a bounding box. The request may include the one or more dimensions of the one or more bounding boxes. In response to the request, the media content item may be received, and the candidate image and the media content item overlaid on top of the candidate image within the bounding box may be displayed.

Media Content Insertion Process

Figure 1:
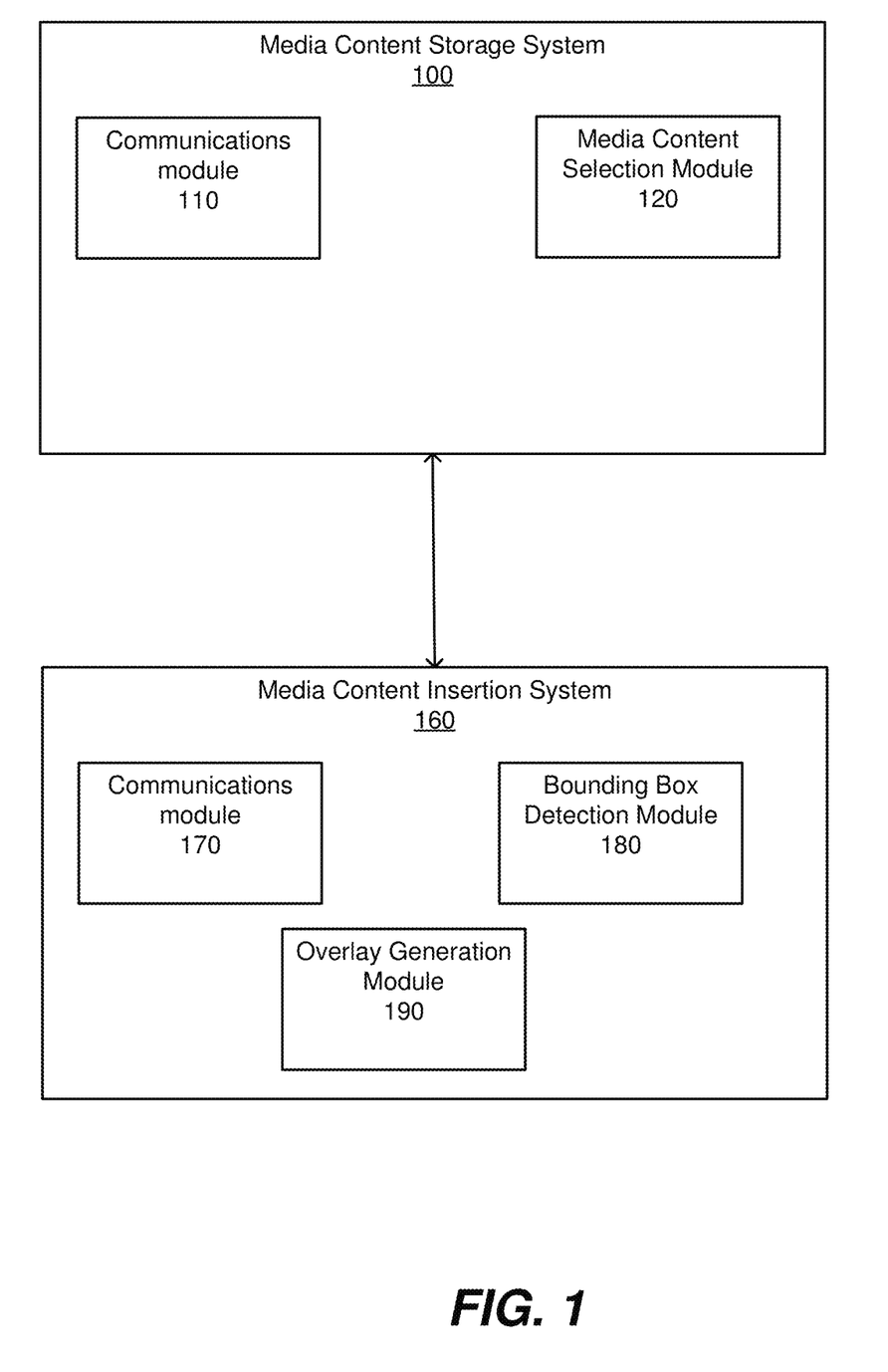
FIG. 1 illustrates a system for detecting space suitable for overlaying media content onto an image, in accordance with some embodiments.

FIG. 1 illustrates an exemplary system for detecting space suitable for overlaying media content onto an image. The system may include a media content storage system 100 and a media content insertion system 160. Media content insertion system 160 includes a communications module 170, bounding box detection module 180, and overlay generation module 190.

Communications module 170 may include hardware, software, or a combination of the two to communicate and may be used by media content insertion system 160 to communicate with other systems (e.g., media content storage system) and devices. Communications module 170 may receive a candidate image for overlaying media content. Communications module 170 may receive the candidate image from another device or a location within the media content insertion system. The candidate image may be any appropriately formatted image. In some embodiments, the candidate image may be a frame of a video content item. Communications module 170 may pass the candidate image to bounding box detection module 180.

Bounding box detection module 180 may receive the candidate image from communications module 170 and process the candidate image. Bounding box detection module 180 may input the candidate image into a neural network to receive as output one or more bounding boxes. The input operation occurs after the neural network has been trained with training data. The training data in this instance includes images and, for each image one or more corresponding bounding boxes. In some embodiments, the neural network may be a convolution neural network. The network may use as input image pixels transformed into vectors. In some embodiments, the neural network may be a multi-layer perceptron that includes an input layer, a hidden layer and an output layer. This type of network may include other layers.

As referred to herein, a bounding box refers to an area on an image for placing media content. Although a bounding box is illustrated as a rectangle, the bounding box may be any shape, including but not limited to, a square, a circle, a pentagon, and any other suitable shape. The bounding box may be of an irregular dimension and/or include multiple shapes.

For example, a bounding box may be represented by a rectangle including one or more coordinates on the candidate image and one or more dimensions extending from the one or more coordinates. In some embodiments, a bounding box may be represented by a coordinate that is counted in terms of a number of pixels horizontally and vertically from the upper left-hand corner of the candidate image and two dimensions. That coordinate may represent the upper left-hand corner of the bounding box. The two dimensions may include a vertical offset and a horizontal offset extending from the coordinate. Based on the coordinate and the offsets, a rectangular bounding box having an area based on the offsets and the location based on the coordinate may be generated.

Figure 2:
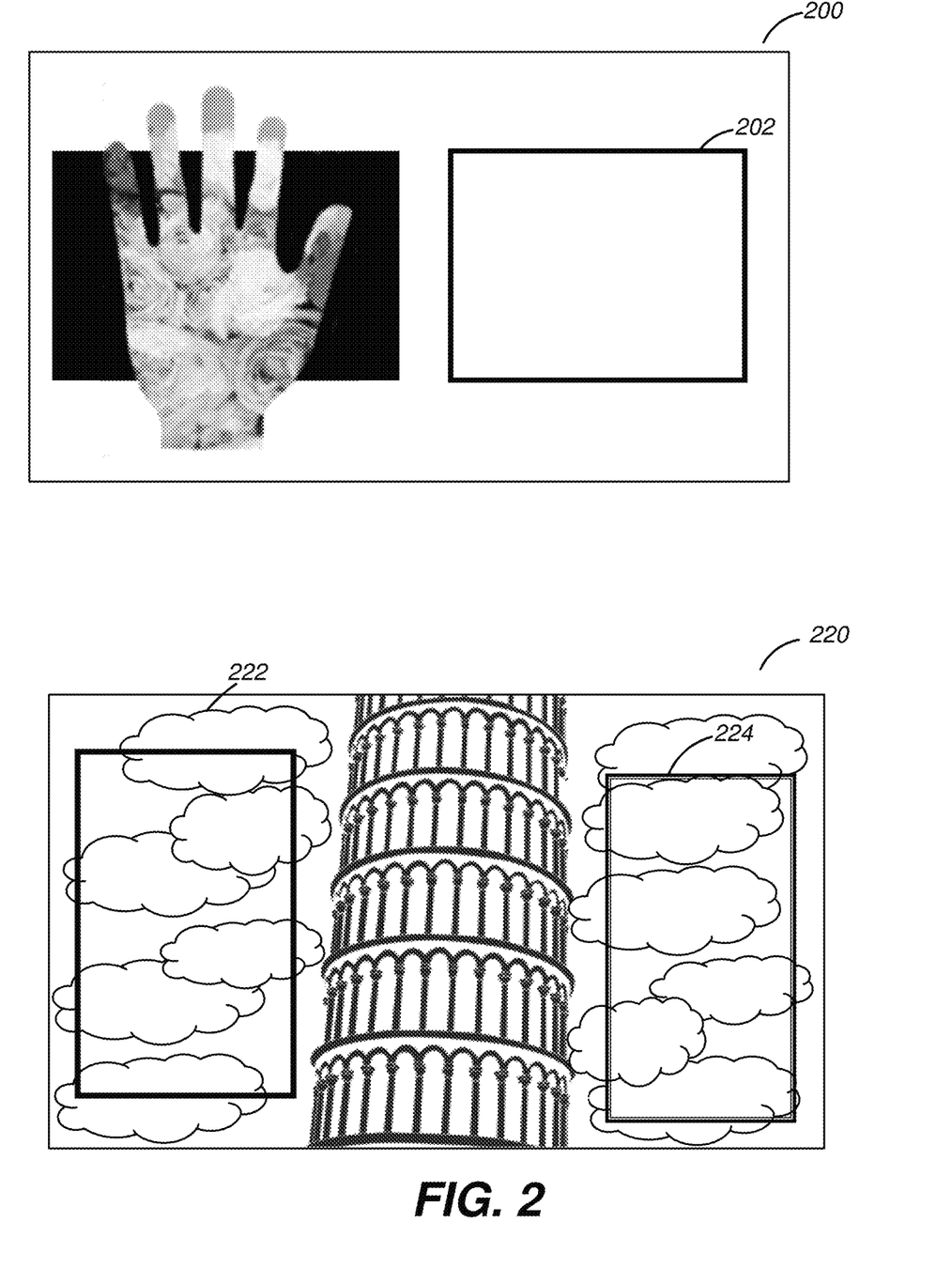
FIG. 2 illustrates images with exemplary bounding boxes.

FIG. 2 illustrates images with exemplary corresponding bounding boxes. Image 200 illustrates bounding box 202. However, different size/shape bounding boxes may be added to image 200. Image 220 is illustrated with two corresponding bounding boxes (bounding box 222 and bounding box 224). Although bounding box 222 and bounding box 224 are illustrated as rectangular those bounding boxes may be of different shapes and sizes.

In some embodiments, media content insertion system 160 may receive, from the neural network, a first coordinate representing a first offset along a horizontal axis of the candidate image and a second coordinate representing a second offset along a vertical axis of the candidate image. The two coordinates may represent a particular pixel on the candidate image. The pixel may serve as a point associated with the bounding box. For example, as discussed above, the point may be a center of a circle, a corner of a rectangle, a triangle, a square, or another suitable point. Media content insertion system 160 may receive a first dimension extending from the first coordinate along the horizontal axis. For example, the first dimension may be a number of units (e.g., pixels) that media content insertion system 160 may use to calculate the next point (e.g., in a horizontal direction) associated with the bounding box. In some embodiments, the first dimension may correspond to a diameter of a circle, a radius of a circle, a side of a rectangle, a side of a square or a side of a triangle.

In some embodiments, media content insertion system 160 may receive a second dimension extending from the second coordinate along the vertical axis. The second dimension may be a number of units (e.g., pixels) that media content insertion system 160 may use to calculate the next point (e.g., in a vertical direction) associated with the bounding box. In some embodiments, the second dimension may correspond to radii or diameters of an oval, a second side of a rectangle, or a triangle. In some embodiments, the received bounding box may only have one dimension and the second dimension may not be shown.

In some embodiments, media content insertion system 160 may receive a probability that a corresponding bounding box is located on the candidate image in an area suitable for inserting the media content into the candidate image. For example, the neural network may return a multitude of possible bounding boxes each having a probability of the bounding box being a valid bounding box for inserting media content into the candidate image. Bounding box detection module 180 may determine for each bounding box whether a corresponding probability meets a threshold probability. For example, the threshold probability may be a percentage value, a value between zero and one or another suitable value. The threshold probability may be set to, for example, 0.5, 0.8. 0.9 or to another suitable value. Bounding box detection module 180 may, for example, retrieve the threshold probability from memory. In response to determining that a probability for a particular bounding box does not meet the threshold probability, bounding box detection module 180 removes the particular bounding box from the request. That is, the bounding boxes received from the neural network may be filtered based on probability.

Figure 3:
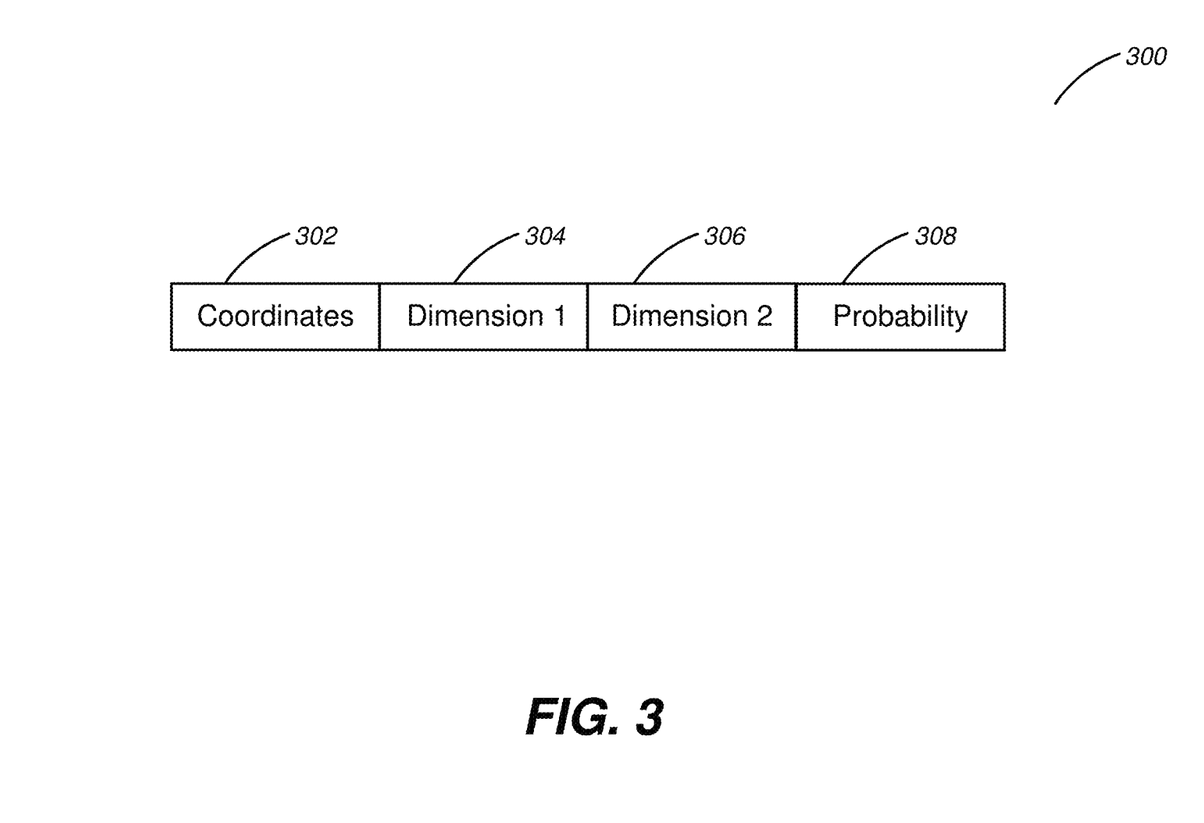
FIG. 3 illustrates an example of a data structure with corresponding fields that represents an output of the neural network.

FIG. 3 illustrates an example of a data structure with corresponding fields that represents an output of the neural network representing a bounding box. Data structure 300 of FIG. 3 may include one or more fields. Field 302 may include one or more coordinates associated with the bounding box. For example, field 302 may include a coordinate of a corner of a rectangular bounding box, a center of a circular bounding box or another suitable point associated with the bounding box. In some embodiments field 302 may include a vector of points representing a bounding box. Field 304 may include a first dimension stored as a number of units (e.g., pixels) to offset from a point represented by the coordinates in field 302. Field 306 may include a second dimension stored as a number of units (e.g., pixels) to offset from a point represented by the coordinates in field 302. There may be other dimension stored in data structure 300. Field 308 stores a probability that the bounding box represented by the particular data structure is a valid bounding box. In some embodiments, each field of data structure 300 may be a coordinate in a vector of coordinates representing an irregular bounding box.

As discussed above, in some embodiments, the bounding box(es) may be of different shapes. For example, a bounding box may be a square (e.g., represented by a coordinate and one offset), a circle (e.g., represented by a coordinate being the center of the circle and one dimension representing a radius or a diameter of the circle), an oval (e.g., represented by two radii and a coordinate at the center). As discussed above, a bounding box may be any shape and/or may have irregular dimensions. In some embodiments, a bounding box may be represented by a vector of points representing coordinates on the candidate image. The vectors and connections of those vectors may represent a bounding box.

In some embodiments, the neural network may be trained using images (sometimes referred to as training images) with known bounding boxes. The neural network may be trained using a training module (not shown) which may be part of media content insertion system 160 or a different system. The training module may receive a multitude of training images and corresponding vectors. Each vector may include a set of coordinates and a set of dimensions, representing a particular bounding box. In some embodiments, some training images may include more than one bounding box and, thus, may correspond to multiple vectors. The training module may input the training images and the corresponding vectors into the neural network to train the neural network.

Referring back to FIG. 1, bounding box detection module 180 may receive, from the neural network, coordinates and one or more dimensions representing one or more bounding boxes for inserting media content into the candidate image. Bounding box detection module 180 may receive a data structure as illustrated in FIG. 3. Bounding box detection module 180 passes the one or more bounding boxes to overlay generation module 190.

Overlay generation module 190 may include hardware, software, or a combination of both. Overlay generation module 190 may generate a request for a media content item to be displayed in a bounding box received from bounding box detection module 180. The request may include one or more dimensions of the one or more bounding boxes. Overlay generation module 190 may pass the request to communications module 170 that may transmit the request to media content storage system 100 (e.g., to communications module 110).

Communications module 110 may receive the request and pass the request to media content selection module 120. Communications module 110 may include hardware, software, or a combination of both. Media content selection module 120 may extract data associated with each bounding box (e.g., one or more data structures 300 of FIG. 3) and search for media content (e.g. in a database) having dimensions that match the dimensions of the one or more bounding boxes. Media content selection module 120 may retrieve (e.g. from the database) one or more media content items that match the one or more bounding box dimensions and generate a response to the request that includes one or more media content items. In some embodiments, in addition to each media content item, the response may include metadata associated with each media content item. The metadata may include the dimensions of the corresponding media content item as well as other information (e.g., name, type (image, video, etc.)), orientation, and/or other suitable information. Media content selection module 120 may pass the response to communications module 110. Communications module 110 may transmit the response to media content insertion system 160.

In some embodiments, the response may include one or more identifiers of the one or more media content items. Each identifier may be part of a data structure that also includes dimensions for each media content item. Other information may be included in the data structure (e.g., name, type (image, video, etc.)). This may be advantageous because media content items may be large in size and may take a long time to transfer in comparison to just transferring an identifier. In some embodiments, the response may include a link to each media content item so that it can be retrieved.

Media content insertion system 160 may receive, using communications module 170, the response to the request that includes one or more media content items. Communications module 170 may pass the response to overlay generation module 190. Overlay generation module 190 may include hardware, software, or a combination of both. Overlay generation module 190 may extract from the response the one or more media content items.

In some embodiments, overlay generation module 190 may receive multiple media content items and may select one of the received media content items to be displayed based on the dimensions of the content item matching the dimensions of a bounding box that has a highest probability of being a valid bounding box. For example, in response to the request, media content insertion system 160 may receive multiple media content items corresponding to multiple bounding boxes. Overlay generation module 190 may identify from the plurality of media content items, a particular media content item corresponding to a bounding box with the highest probability. Overlay generation module 190 may access the metadata of each received media content item and retrieve the dimensions for each media content item. Overlay generation module 190 may retrieve probabilities for each of the detected bounding boxes and determine which bounding box has the highest probability.

Overlay generation module 190 may retrieve dimensions of the bounding box with the highest probability and compare those dimensions to the dimensions of media content items. Overlay generation module 190 may select the media content item that best matches the dimensions. For example, some media content items may be too large, thus, overlay generation module 190 may filter those out. Overlay generation module 190 may select the media content item with the dimensions closest to those of the selected bounding box. In some embodiments, overlay generation module 190 may take into account orientation of the media content item. For example, if a particular media content item should be displayed in portrait orientation and the orientation of the bounding box would force the media content item to be sideways, based on the dimensions, overlay generation module 190 may filter (e.g., remove from consideration) that particular media content item. When overlay generation module 190 selects a media content item, overlay generation module 190 may cause a display of the candidate image and the media content item overlaid on top of the candidate image within the bounding box.

Figure 4:
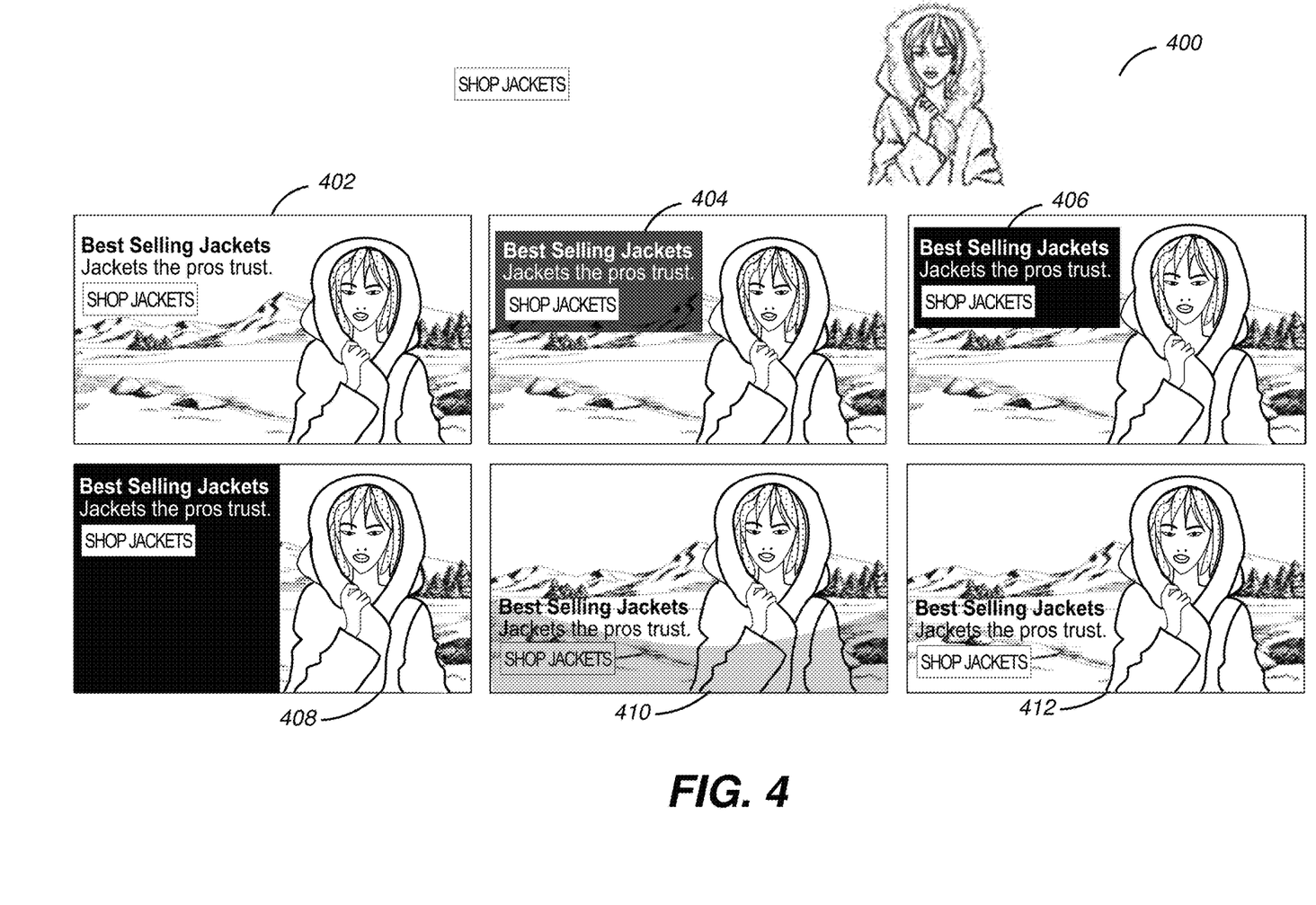
FIG. 4 illustrates various media content items being overlaid over a candidate image.

FIG. 4 illustrates various media content items being overlaid over a candidate image. Image 402 illustrates a media content item in one bounding box. In this instance the dimensions of the bounding box are not apparent from the overlay. Image 404 illustrates an example of a bounding box that fits the media content item. The bounding box may be illustrated by the box around the media content item. In this case, the media content item may be text or an image. In some embodiments, the media content item may be associated with a selectable graphical user element that when selected instructs a computing device to open a link to, for example, a web page associated with the content of the bounding box.

Image 406 illustrates another media content item that may use the same bounding box. It should be noted that the media content items in image 404 and 406 are different. The media content item in image 404 has a transparent component while the media content item in image 406 has no transparent portions. Images 408, 410, and 412 illustrate other examples of bounding boxes on the same image.

In some embodiments, the image may be a frame of a video content item. Media content insertion system 160 may process those frames in a different manner. For example, media content insertion system 160 may determine that the candidate image is a video frame associated with a video content item. Overlay generation module 190 may make the determination based on an indicator in the image metadata or based on another signal received with the candidate image.

Bounding box detection module 180 may retrieve a set of video frames of the video content item. For example, the bounding box detection module may request the frames using an application programming interface (API). The set of video frames may include video frames that are played subsequently to the candidate image. For example, the candidate image may be a first frame in a set of consecutive frames to be played back by a video player and it may be desirable to insert a media content item (e.g., an advertisement) into at least some of those frames.

Bounding box detection module 180 may input each video frame of the set of video frames into the neural network. For example, bounding box detection module 180 may input the frames into the neural network consecutively based on order of playback. Bounding box detection module may receive, from the neural network for each video frame in the set of video frames, corresponding coordinates and corresponding dimensions representing one or more bounding boxes. That is, bounding box detection module 180 may process each video frame in the same manner as a candidate image to identify on or more bounding boxes in each frame.

Bounding box detection module 180 may identify in each video frame of the set of video frames, a bounding box matching a bounding box in each other video frame within the set. For example, bounding box detection module 180 may determine that the same copy space (e.g., bounding box) is available on all the frames in the set or at least a subset of frames in the set. Bounding box detection module 180 may then include the bounding box in the request. In some embodiments, bounding box detection module may detect one bounding box in some frames in the set and another bounding box in other frames. Based on that bounding box detection module 180, may include both bounding boxes in the request. After the response to the request is received, overlay generation module 190 may cause a display of the set of video frames and the media content item overlaid on top of each of the plurality of subsequent video frames within the bounding box. That is, the video may be played back with one or more bounding boxes included in one or more consecutive frames.

Computing Machine Architecture

Figure 5:
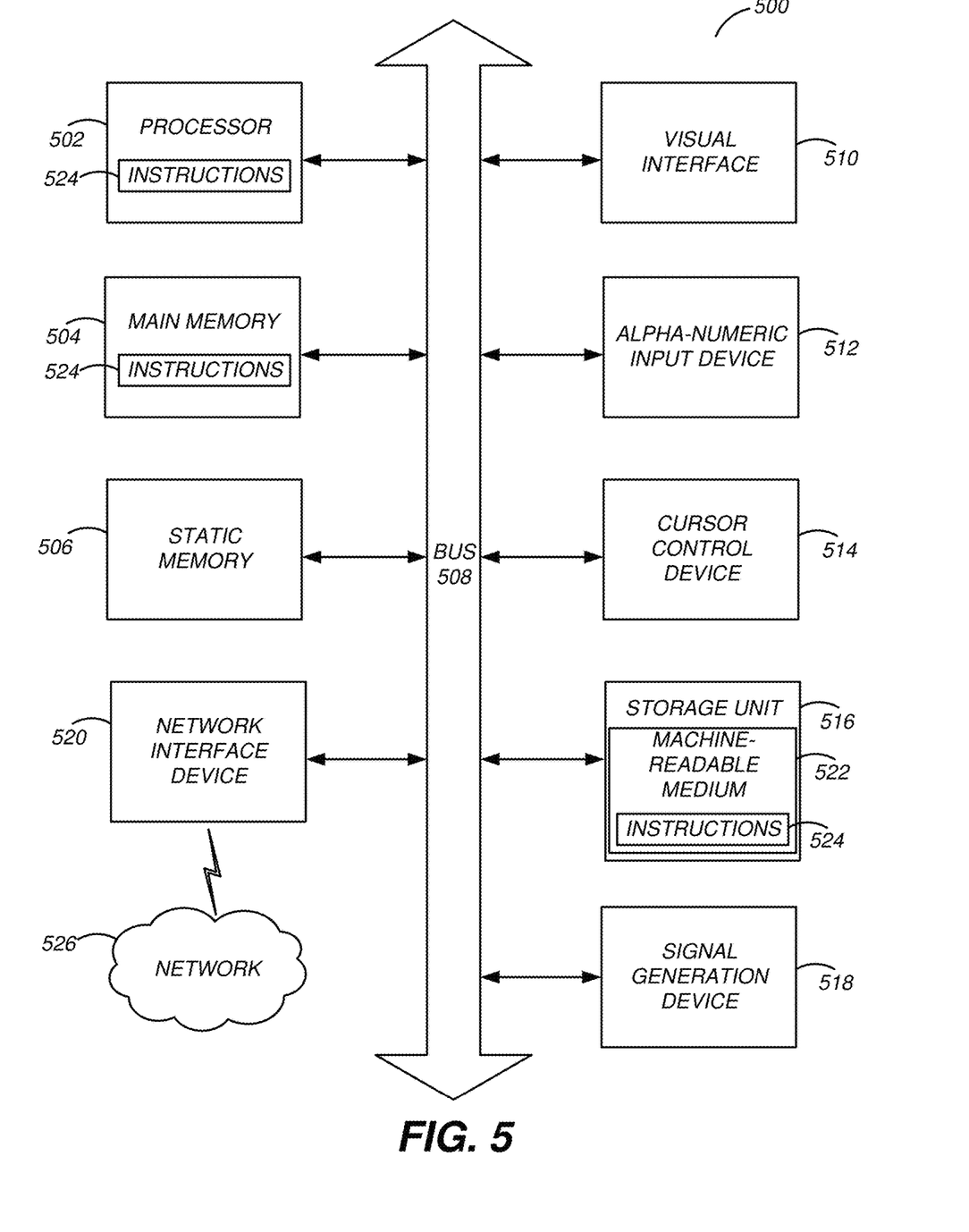
FIG. 5 is a block diagram illustrating components of an example machine able to read instructions from a machine-readable medium and execute them in a processor (or controller).

Each of media content storage system 100 and media content insertion system 160 may include one or more components described in FIG. 5. FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alpha-numeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Figure 6:
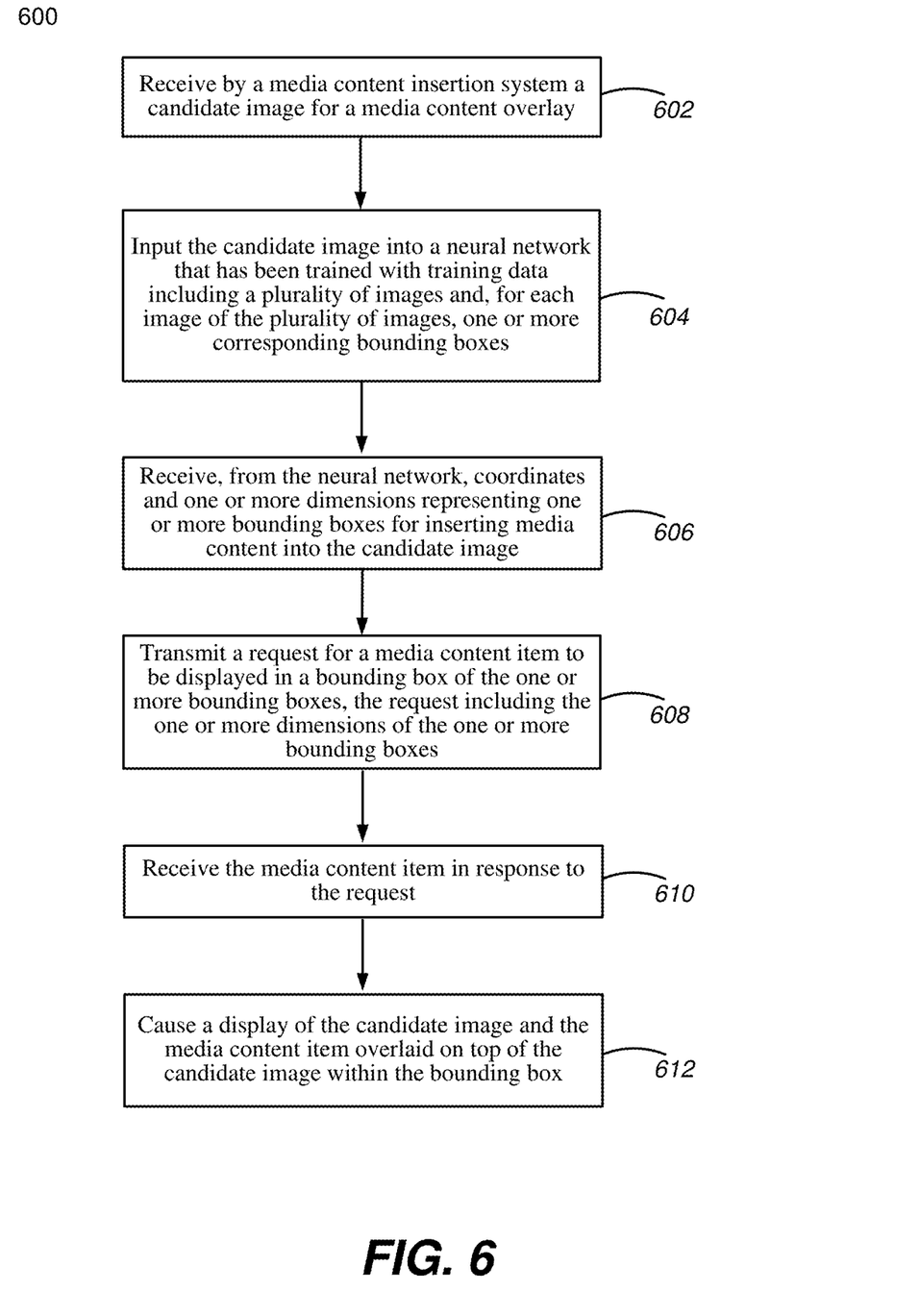
FIG. 6 illustrates actions for detecting space suitable for overlaying media content onto an image.

The components of FIG. 5 may be used in a system or process for detecting space suitable for overlaying media content onto an image. FIG. 6 illustrates a flow chart of such a process for detecting space suitable for overlaying media content onto an image. At 602, media content insertion system 160 receives a candidate image for a media content overlay. For example, media content insertion system 160 may include a network interface device 520 of FIG. 5 and receive the candidate image through network 526 using network interfaced device 520. Media content insertion system 160 may store the candidate image in memory (e.g., main memory 504 and/or storage unit 516).

At 604, media content insertion system 160 inputs the candidate image into a neural network that has been trained with training data including a plurality of images and, for each image of the plurality of images, one or more corresponding bounding boxes. The neural network may be stored in a memory (e.g., main memory 504 and/or storage unit 516). The neural network may include an application programming interface for inputting images and corresponding metadata. Media content insertion system 160 may use one or more processor 502 to perform the input and may use those same processors to process the candidate image within the neural network.

At 606, media content insertion system 160 receives, from the neural network, coordinates and one or more dimensions representing one or more bounding boxes for inserting media content into the candidate image. Media content insertion system 160 may receive the coordinates and dimensions and store them in, for example, main memory 502. At 608, media content insertion system 160 transmits a request for a media content item to be displayed in a bounding box of the one or more bounding boxes, the request including the one or more dimensions of the one or more bounding boxes. For example, media content insertion system 160 may use network interface device 520 to transmit the request over network 526.

At 610, media content insertion system 160 receives the media content item in response to the request. For example, media content insertion system 160 may receive the request using network interface device 520 through network 526. At 612, media content insertion system 160 causes a display of the candidate image and the media content item overlaid on top of the candidate image within the bounding box. For example, media content insertion system 160 may transmit the overlaid candidate image to a client device for display. In some embodiments, media content insertion system 160 may use visual interface 510 to cause the display of the overlaid candidate image.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for inserting media content into copy space available on an image. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for detecting space suitable for overlaying media content onto an image, the method comprising:

training a neural network using a plurality of images, each of the plurality of images corresponding to one or more vectors, each vector comprising (1) a coordinate representing a point associated with a bounding box in a corresponding image, and (2) a dimension of the bounding box, wherein each bounding box is suitable for media content overlay;

receiving by a media content insertion system a candidate image for a media content overlay;

inputting the candidate image into the neural network;

outputting, by the neural network, one or more bounding boxes as one or more data structures, each of which comprises at least (1) a coordinate representing a point associated with the bounding box, (2) a dimension of the bounding box, and (3) a probability that the bounding box is located in an area suitable for the media content overlay;

for at least one of the one or more bounding boxes,
determining whether the probability meets a threshold probability;
responsive to determining that the probability meets the threshold probability, determining that the bounding box is a candidate bounding box of the candidate image;
receiving, from the neural network, the data structure corresponding to the candidate bounding box of the candidate image;
transmitting a request for a media content item to be displayed in the candidate bounding box of the candidate image, the request comprising the dimension of the candidate bounding box;
receiving the media content item in response to the request; and
causing a display of the candidate image and the media content item overlaid on top of the candidate image within the candidate bounding box.

2. The method of claim 1, further comprising:
receiving the plurality of images;

receiving for each of the plurality of images, one or more vectors, each vector comprising a set of coordinates and a set of dimensions, wherein each vector of the one or more vectors represents a particular bounding box;

training the neural network using each of the plurality of images and corresponding one or more vectors.

3. The method of claim 1, wherein receiving the coordinates and the one or more dimensions representing the one or more bounding boxes for inserting the media content into the candidate image comprises receiving for each bounding box:
- a first coordinate representing a first offset along a horizontal axis of the candidate image and a second coordinate representing a second offset along a vertical axis of the candidate image,
- a first dimension extending from the first coordinate along the horizontal axis, and
- a second dimension extending from the second coordinate along the vertical axis.

4. The method of claim 1, further comprising:
- in response to the request, receiving a plurality of media content items corresponding to the one or more bounding boxes;
- identifying from the plurality of media content items, a particular media content item corresponding to a bounding box with the highest probability; and
- selecting the particular media content item as the media content item.

5. The method of claim 1, further comprising:
- determining that the candidate image is a video frame associated with a video content item;
- retrieving a set of video frames of the video content item, wherein the set of video frames comprises video frames that are played subsequently to the candidate image;
- inputting each video frame of the set of video frames into the neural network;
- receiving, from the neural network for each video frame in the set of video frames, corresponding coordinates and corresponding one or more dimensions representing one or more bounding boxes;
- identifying in each video frame of the set of video frames, a bounding box matching a bounding box in each other video frame within the set of video frames; and
- including the bounding box matching the bounding box of each other video frame in the request.

6. The method of claim 5, further comprising causing a display of the set of video frames and the media content item overlaid on top of each of a plurality of subsequent video frames within the bounding box.

7. A system for detecting space suitable for overlaying media content onto an image, the system comprising:
- memory with instructions encoded thereon; and
- one or more processors that, when executing the instructions, are caused to perform operations comprising:
  - training a neural network using a plurality of images, each of the plurality of images corresponding to one or more vectors, each vector comprising (1) a coordinate representing a point associated with a bounding box in a corresponding image, and (2) a dimension of the bounding box, wherein each bounding box is suitable for media content overlay;
  - receiving by a media content insertion system a candidate image for a media content overlay;
  - inputting the candidate image into the neural network;
  - outputting, by the neural network, one or more bounding boxes as one or more data structures, each of which comprises at least (1) a coordinate representing a point associated with the bounding box, (2) a dimension of the bounding box, and (3) a probability that the bounding box is located in an area suitable for the media content overlay;
  - for at least one of the one or more bounding boxes,
    - determining whether the probability meets a threshold probability;
    - responsive to determining that the probability meets the threshold probability, determining that the bounding box is a candidate bounding box of the candidate image;
    - receiving, from the neural network, the data structure corresponding to the candidate bounding box of the candidate image;
    - transmitting a request for a media content item to be displayed in the candidate bounding box of the candidate image, the request comprising the dimension of the candidate bounding box;
    - receiving the media content item in response to the request; and
    - causing a display of the candidate image and the media content item overlaid on top of the candidate image within the candidate bounding box.

8. The system of claim 7, wherein the instructions cause the one or more processors to perform operations comprising:
- receiving the plurality of images;
- receiving for each of the plurality of images, one or more vectors, each vector comprising a set of coordinates and a set of dimensions, wherein each vector of the one or more vectors represents a particular bounding box;
- training the neural network using each of the plurality of images and corresponding one or more vectors.

9. The system of claim 7, wherein receiving the coordinates and the one or more dimensions representing the one or more bounding boxes for inserting the media content into the candidate image comprises receiving for each bounding box:
- a first coordinate representing a first offset along a horizontal axis of the candidate image and a second coordinate representing a second offset along a vertical axis of the candidate image,
- a first dimension extending from the first coordinate along the horizontal axis, and
- a second dimension extending from the second coordinate along the vertical axis.

10. The system of claim 7, wherein the instructions cause the one or more processors to perform operations comprising:
- in response to the request, receiving a plurality of media content items corresponding to the one or more bounding boxes;
- identifying from the plurality of media content items, a particular media content item corresponding to a bounding box with the highest probability; and
- selecting the particular media content item as the media content item.

11. The system of claim 7, wherein the instructions cause the one or more processors to perform operations comprising:
- determining that the candidate image is a video frame associated with a video content item;
- retrieving a set of video frames of the video content item, wherein the set of video frames comprises video frames that are played subsequently to the candidate image;
- inputting each video frame of the set of video frames into the neural network;

receiving, from the neural network for each video frame in the set of video frames, corresponding coordinates and corresponding one or more dimensions representing one or more bounding boxes;

identifying in each video frame of the set of video frames, a bounding box matching a bounding box in each other video frame within the set of video frames; and including the bounding box matching the bounding box of each other video frame in the request.

12. The system of claim 11, wherein the instructions cause the one or more processors to perform operations comprising causing a display of the set of video frames and the media content item overlaid on top of each of a plurality of subsequent video frames within the bounding box.

13. A non-transitory computer readable medium storing instructions, the instructions when executed by one or more processors cause the one or more processors to:

train a neural network using a plurality of images, each of the plurality of images corresponding to one or more vectors, each vector comprising (1) a coordinate representing a point associated with a bounding box in a corresponding image, and (2) a dimension of the bounding box, wherein each bounding box is suitable for media content overlay;

receive by a media content insertion system a candidate image for a media content overlay;

input the candidate image into the neural network;

output, by the neural network, one or more bounding boxes as one or more data structures, each of which comprises at least (1) a coordinate representing a point associated with the bounding box, (2) a dimension of the bounding box, and (3) a probability that the bounding box is located in an area suitable for the media content overlay;

for at least one of the one or more bounding boxes,
    determine whether the probability meets a threshold probability;
    responsive to determining that the probability meets the threshold probability, determining that the bounding box is a candidate bounding box of the candidate image;

receive, from the neural network, the data structure corresponding to the candidate bounding box of the candidate image;

transmit a request for a media content item to be displayed in the candidate bounding box of the candidate image, the request comprising the dimension of the candidate bounding box;

receive the media content item in response to the request; and cause a display of the candidate image and the media content item overlaid on top of the candidate image within the candidate bounding box.

14. The non-transitory computer readable medium of claim 13, further comprising stored instructions that cause the one or more processors to:
    receive the plurality of images;
    receive for each of the plurality of images, one or more vectors, each vector comprising a set of coordinates and a set of dimensions, wherein each vector of the one or more vectors represents a particular bounding box;
    train the neural network using each of the plurality of images and corresponding one or more vectors.

15. The non-transitory computer readable medium of claim 13, wherein receiving the coordinates and the one or more dimensions representing the one or more bounding boxes for inserting the media content into the candidate image comprises receiving for each bounding box:
    a first coordinate representing a first offset along a horizontal axis of the candidate image and a second coordinate representing a second offset along a vertical axis of the candidate image,
    a first dimension extending from the first coordinate along the horizontal axis, and
    a second dimension extending from the second coordinate along the vertical axis.

16. The non-transitory computer readable medium of claim 13, further comprising stored instructions that cause the one or more processors to:
    in response to the request, receive a plurality of media content items corresponding to the one or more bounding boxes;
    identify from the plurality of media content items, a particular media content item corresponding to a bounding box with the highest probability; and
    select the particular media content item as the media content item.

17. The non-transitory computer readable medium of claim 13, further comprising stored instructions that cause the one or more processors to:
    determine that the candidate image is a video frame associated with a video content item;
    retrieve a set of video frames of the video content item, wherein the set of video frames comprises video frames that are played subsequently to the candidate image;
    input each video frame of the set of video frames into the neural network;
    receive, from the neural network for each video frame in the set of video frames, corresponding coordinates and corresponding one or more dimensions representing one or more bounding boxes;
    identify in each video frame of the set of video frames, a bounding box matching a bounding box in each other video frame within the set of video frames; and
    include the bounding box matching the bounding box of each other video frame in the request.

* * * * *